US010086937B2

(12) United States Patent
Matsue et al.

(10) Patent No.: US 10,086,937 B2
(45) Date of Patent: Oct. 2, 2018

(54) OBSERVATION DEVICE

(71) Applicants: DENSO CORPORATION, Kariya, Aichi-pref. (JP); NIPPON SOKEN, INC., Nishio, Aichi-pref. (JP); THE UNIVERSITY OF TOKYO, Tokyo (JP)

(72) Inventors: Takenori Matsue, Nishio (JP); Koji Kawasaki, Nichio (JP); Michihiro Matsuura, Nishio (JP); Masami Kurosaka, Nishio (JP); Masayuki Inaba, Tokyo (JP)

(73) Assignees: DENSO CORPORATION, Kariya, Aichi-pref. (JP); SOKEN, INC., Nisshin, Aichi-pref. (JP); THE UNIVERSITY OF TOKYO, Tokyo, Bunkyo-Ku (JP)

( * ) Notice: Subject to any disclaimer, the term of this patent is extended or adjusted under 35 U.S.C. 154(b) by 294 days.

(21) Appl. No.: 14/925,005

(22) Filed: Oct. 28, 2015

(65) Prior Publication Data
US 2016/0122018 A1 May 5, 2016

(30) Foreign Application Priority Data

Oct. 29, 2014 (JP) ................. 2014-220637

(51) Int. Cl.
*B64C 11/00* (2006.01)
*B64C 39/02* (2006.01)
(Continued)

(52) U.S. Cl.
CPC ......... *B64C 39/024* (2013.01); *G05D 1/0094* (2013.01); *G05D 1/0858* (2013.01);
(Continued)

(58) Field of Classification Search
CPC ............ B64C 39/024; B64C 2201/027; B64C 2201/127; B64C 2201/042;
(Continued)

(56) References Cited

U.S. PATENT DOCUMENTS 5,080,304 A    1/1992  Stump et al.
5,082,079 A *  1/1992  Lissaman ............... B64C 27/20
                                                          180/118

(Continued)

FOREIGN PATENT DOCUMENTS

JP        H1101297 A     1/1999
JP        2014-062789 A  4/2014

*Primary Examiner* — Assres H Woldemaryam
(74) *Attorney, Agent, or Firm* — Harness, Dickey & Pierce, P.L.C.

(57) ABSTRACT

A observation device includes an aircraft and an observation unit attached to the aircraft that observes a target within a predetermined view angle. The aircraft includes a base, at least two thrusters that generate a propulsion force including lift, actuators that change a direction of the propulsion force generated by the thrusters with respect to the base, an inertial measurement unit (IMU) that detects an orientation of the base with respect to a ground surface, and a controller that controls the thrusters and the actuators based on the orientation of the base detected by the IMU. The observation unit is fixedly attached to the base and the aircraft is configured to fly in any arbitrary orientation with respect to the ground surface through a combination of a magnitude of the propulsion force and the direction of the propulsion force of each of the thrusters.

13 Claims, 10 Drawing Sheets

(51) Int. Cl.
  *H04N 7/18* (2006.01)
  *G05D 1/00* (2006.01)
  *G05D 1/08* (2006.01)

(52) U.S. Cl.
  CPC ....... *H04N 7/185* (2013.01); *B64C 2201/027* (2013.01); *B64C 2201/042* (2013.01); *B64C 2201/127* (2013.01); *B64C 2201/141* (2013.01)

(58) Field of Classification Search
  CPC ............ B64C 2201/141; G05D 1/0858; G05D 1/0094; H04N 7/185
  See application file for complete search history.

(56) References Cited

U.S. PATENT DOCUMENTS

| | | | |
|---|---|---|---|
| 6,260,796 B1* | 7/2001 | Klingensmith | B64C 27/08 244/17.11 |
| 7,364,114 B2* | 4/2008 | Wobben | B64C 27/20 244/12.3 |
| 2009/0283629 A1 | 11/2009 | Kroetsch et al. | |
| 2010/0044499 A1 | 2/2010 | Dragan et al. | |
| 2010/0301168 A1* | 12/2010 | Raposo | A63H 23/00 244/171.2 |
| 2011/0001001 A1 | 1/2011 | Bryant | |
| 2012/0083945 A1 | 4/2012 | Oakley et al. | |
| 2014/0131507 A1* | 5/2014 | Kalantari | A63H 27/12 244/2 |
| 2015/0232181 A1* | 8/2015 | Oakley | B64C 39/024 701/2 |
| 2015/0377405 A1* | 12/2015 | Down | B64C 39/024 73/865.8 |

* cited by examiner

OBSERVATION DEVICE

CROSS REFERENCE TO RELATED APPLICATION

The present application is based on Japanese Patent Application No. 2014-220637 filed on Oct. 29, 2014, disclosure of which is incorporated herein by reference.

TECHNICAL FIELD

The present disclosure relates to an observation device, which is equipped with observation equipment, that observes a target while flying.

BACKGROUND

In recent years, unmanned aerial vehicles (UAV) have been mounted with observation equipment and used to observe the situation at dangerous locations difficult for personnel to enter, e.g., disaster areas. An example of such UAV-mounted observation equipment is aerial cameras.

For example, JP 2014-062789 A describes providing an aircraft mounted with aerial photography equipment including an imaging unit and a GPS device. Using this aerial photography equipment, the aircraft may obtain images with the imaging unit and obtain an estimated position with the GPS device.

SUMMARY

However, the aerial photography equipment proposed by JP 2014-062789 A is unable to photograph targets at locations higher than the aircraft itself.

Further, this aerial photography equipment is configured to capture the photography target by changing the direction of the imaging unit (e.g., a camera) suspended from the aircraft while the aircraft itself maintains its orientation toward the ground. However, in this configuration, depending on the direction of the camera, the aircraft may enter the view angle of the camera, and thus there is a concern that the photography scope may be limited.

In view of the above, it is an object of the present disclosure to provide an observation device that may hover while observing an observation target in any arbitrary direction.

In of view the above, according to the present disclosure, there is provided an observation device including an aircraft and an observation unit attached to the aircraft that observes a target within a predetermined view angle. The aircraft includes a base to which the observation unit is attached, at least two thrusters that generate a propulsion force including lift, actuators that change a direction of the propulsion force generated by the thrusters with respect to the base, an inertial measurement unit (IMU) that detects an orientation of the base with respect to a ground surface, and a controller that controls the thrusters and the actuators based on the orientation of the base detected by the IMU. The observation unit is fixedly attached to the base so as to be immovable relative to the base, and the aircraft is configured to fly in any arbitrary orientation with respect to the ground surface through a combination of a magnitude of the propulsion force and the direction of the propulsion force of each of the thrusters.

As described above, this observation device includes thrusters which generate a propulsion force with an adjustable direction with respect to the base. Accordingly, even if the observation device is not positioned with all of the thrusters coplanar on a plane parallel to the ground surface, the direction of the propulsion force generated by the thrusters may be changed so as to generate the necessary lift for hovering. Accordingly, the observation may hover and move while the base maintains an inclined orientation toward the ground surface.

In other words, this observation device may stay still with the observation unit facing any arbitrary direction. Accordingly, even if the observation unit is fixed with respect to the base, observation in any arbitrary direction may be performed.

Further, in this observation device, the observation unit is fixed to the base, thus compared to conventional devices, a movable unit for adjusting the direction of the observation unit toward an observation target is not required. Accordingly, the connection between the base and the observation unit may be simplified. Moreover, the weight of the observation device itself may be reduced.

Further, in a preferable aspect, the observation device may be further configured such that a first shaft unit and a second shaft unit are attached to the base through the actuators, axes of rotation of the first shaft unit and the second shaft unit being parallel to each other, at least one of the thrusters is fixed to each of the first shaft unit and the second shaft unit, and the actuators are configured to change the direction of the propulsion force of the thrusters with respect to the base by rotating the first shaft unit and the second shaft unit about the axes of rotation.

In this configuration, the thrusters are rotatable about respective axes of rotation. Accordingly, the entire aircraft may rotate 360 degrees on a plane orthogonal to the axes of rotation while maintaining a hovering state. In addition, by combining conventionally known roll (or pitch) and yaw maneuvers, the observation unit may be pointed in any direction of all $4\pi$ steradians of solid angles.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
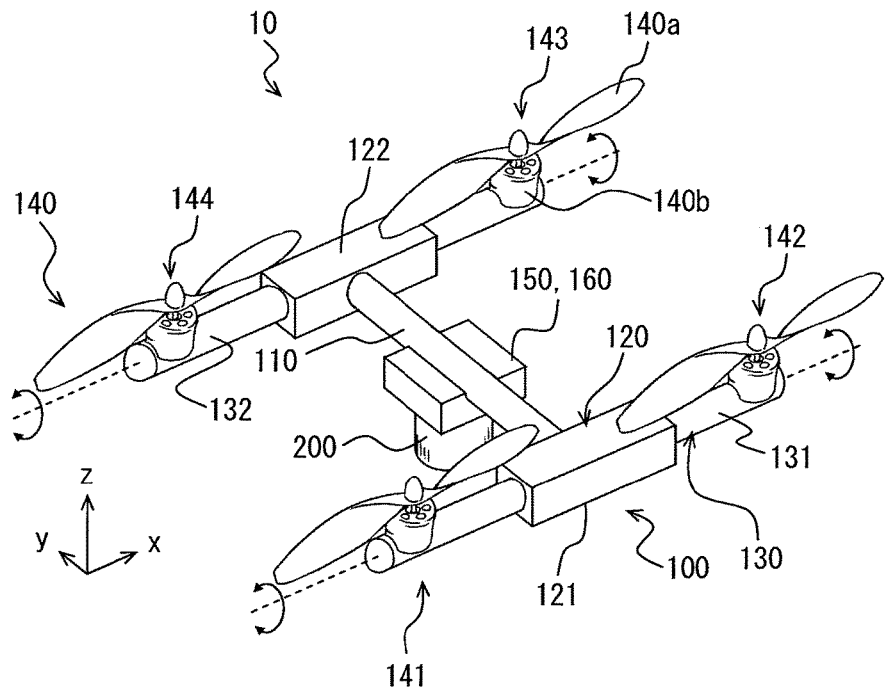
FIG. 1 is a perspective view showing the outline configuration of an observation device.

Hereinafter, embodiments of the present disclosure will be explained with reference to the figures. Further, portions of each figure which are identical or substantially equivalent are denoted with the same reference numerals. In addition, a fixed coordinate system with respect to an aircraft includes an x-axis, a y-axis orthogonal to the x-axis, and a z-axis linearly independent of the x-axis and the y-axis. In other words, this coordinate system is not fixed with respect to the ground surface, but rather changes according to an orientation of an aircraft.

First Embodiment

First, an outline configuration of an observation device according to the present embodiment will be explained with reference to FIGS. 1 and 2.

An observation device of the present embodiment is primarily used for taking aerial shots, e.g., by a camera mounted to a multirotor-type unmanned aerial vehicle (UAV). Such a camera is not limited to capturing wavelengths of light in the visible spectrum, and may capture longer wavelengths (e.g., infrared) or shorter wavelengths (e.g., X-ray).

As shown in FIG. 1, an observation device 10 includes an aircraft 100 and a camera 200. The primary function of the aircraft 100 is to fly, while the camera 200 is an observation unit whose primary function is imaging.

The aircraft 100 is a quadcopter that includes a base 110, two actuators 120, two shaft units 130, four thrusters 140, an inertial measurement unit (IMU) 150, and a controller 160. Further, while not shown in FIG. 1, a battery is also mounted to the aircraft 100 as a power source for the actuators 120, the thrusters 140, the IMU 150, the controller 160, and the camera 200, as will be described later.

The base 110 is a rod member that extends along the y-axis. For example, the base 110 may be formed from plastic or metal materials. The base 110 acts as a frame that supports the entire aircraft 100. As such, the actuators 120, the IMU 150, and the controller 160 are fixed to the base 110, as will be described later. Further, the camera 200 is also fixed to the base 110. A respective one of the actuators 120 is fixed to either end of the rod-shaped base 110. Further, the IMU 150 and the controller 160 are collectively disposed at the center of gravity of the base 110. In the present embodiment, the battery is also collectively disposed at the center of gravity of the base 110.

The actuators 120 include a first actuator 121 and a second actuator 122, which are fixed to either end of the rod-shaped base 110 as described above. In the present embodiment, the actuators 120 drive the shaft units 130, which will be explained later, so as to rotate the shaft units 130 about the x-axis. In the present disclosure, the first actuator 121 and the second actuator 122 are collectively referred to as "actuators 120" where appropriate.

The shaft units 130 include a first shaft unit 131 connected to the first actuator 121 and a second shaft unit 132 connected to the second actuator 122. In the present embodiment, the shaft units 130 are linear members that extend along the x-axis. Specifically, the first shaft unit 131 and the second shaft unit 132 extend along the x-axis so as to be parallel to each other. Further, the shaft units 130 may be driven by the actuators 120 to rotate 360 degrees about the x-axis.

Hereinafter, a rotation angle of the shaft units 130 is referred to as a tilt angle. Further, the first shaft unit 131 and the second shaft unit 132 of the first embodiment, as well as a first shaft unit 133 and a second shaft unit 134 of a second embodiment to be described later, are collectively referred to as "shaft units 130" where appropriate.

The thrusters 140 each include a propeller unit 140a and a motor unit 140b. The propeller units 140a are driven by the motor units 140b to rotate, thereby generating a propulsion force. The thrusters 140 are fixed to the shaft units 130 so as to generate the propulsion force in a direction orthogonal to the x-axis. Further, when the shaft units 130 are driven by the actuators 120 to rotate about the x-axis, the direction of the propulsion force generated by the thrusters 140 with respect to the base 110 may be changed. Specifically, when the shaft units 130 rotate about the x-axis, a vector representing the principle direction of the propulsion force is rotated on the yz-plane. Further, the rotational speed of the propeller units 140a of the thrusters 140 is variable. The propulsion force is generated according to the rotational speed of the propeller units 140a. In other words, by increasing the rotational speed of the propeller units 140a, the propulsion force may be increased.

In addition, slip rings are used at the driven portions of the shaft units 130. Accordingly, rotation of the thrusters 140 about the x-axis is not hindered by, e.g., a signal cable connecting the thrusters 140 to the IMU 150 or the controller 160, or a power cable connecting the thrusters 140 to the battery.

In the present embodiment, the thrusters 140 include a first thruster 141, a second thruster 142, a third thruster 143, and a fourth thruster 144. The first thruster 141 and the second thruster 142 are symmetrical about the first actuator 121, and are fixed to the end portions of the first shaft unit 131. The third thruster 143 and the fourth thruster 144 are symmetrical about the second actuator 122, and are fixed to the end portions of the second shaft unit 132. The four thrusters 140 are coplanar with the xy-plane.

Further, when viewing the aircraft 100 from the top (i.e., from the positive direction of the z-axis) as shown in FIG. 1, the first thruster 141, the second thruster 142, the third thruster 143, and the fourth thruster 144 are positioned counter-clockwise in this order. In the present disclosure, the first thruster 141, the second thruster 142, the third thruster 143, and the fourth thruster 144 are collected referred to as "thrusters 140" where appropriate.

The IMU 150 includes three-axis gyroscopes and three-axis accelerometers, similar to typical inertial measurement units used in aircrafts and such. The IMU 150 detects the orientation, angular velocity, and acceleration of the aircraft 100. The gyroscopes may be mechanical-type gyroscopes including rotating discs, or may be high precision, light-weight ring laser gyroscopes based on the Sagnac effect. Further, the accelerometers may be mechanical-type position estimating accelerometers, or may be semiconductor-type accelerometers based on optical or piezoelectric technologies.

Figure 2:
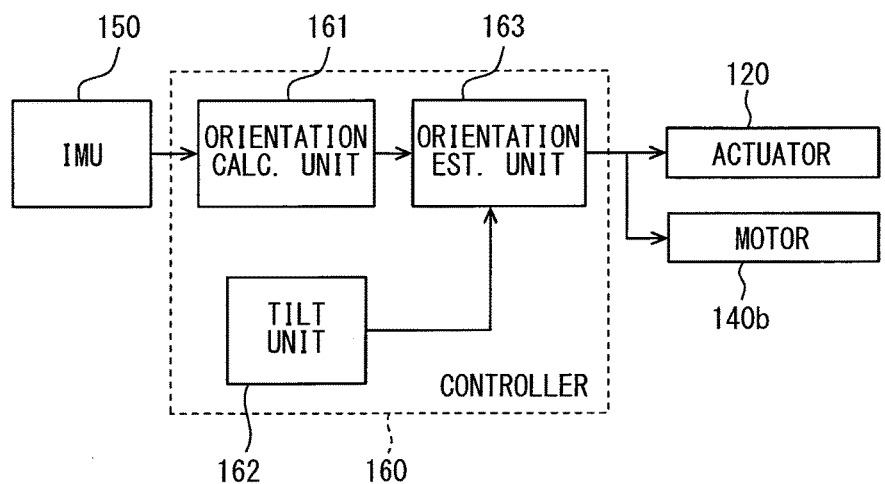
FIG. 2 is a block diagram showing the configurations of an inertial measurement unit and a controller.

As shown in FIG. 2, the IMU 150 is connected to the controller 160 so as to be in communication therewith, and outputs information related to the orientation of the aircraft 100 to the controller 160. It should be noted that instead of gyroscopes and accelerometers, the IMU 150 may perform high speed, high precision calculations of the orientation of the aircraft 100 by using other devices such as a GPS, a pressure sensor, an airflow sensor, a magnetic sensor, a star tracker, or the like. Further, the flow of signals from the IMU 150 is shown with an arrow in FIG. 2.

The controller 160 estimates the orientation of the aircraft 100 based on the information output from the IMU 150. Then, based on the estimated orientation and external instructions, the controller 160 controls the operation of the actuators 120 (i.e., the tilt angle), and controls the outputs of the thrusters 140 and the motors units 140b. As shown in FIG. 2, the controller 160 includes an orientation calculation unit 161, a tilt angular velocity acquisition unit 162, and an orientation estimation unit 163.

The orientation calculation unit 161 calculates the orientation of the aircraft 100 with respect to the ground surface based on the angular velocity of the rotation of the aircraft 100 and the translational acceleration of the aircraft 100, which are obtained by the IMU 150.

The tilt angular velocity acquisition unit 162 obtains the rotational angular velocity of the shaft units 130 through the actuators 120. Further, the tilt angular velocity acquisition unit 162 obtains a desired angular velocity of a target tilt angle specified by external instructions.

The orientation estimation unit 163 estimates a target orientation of the aircraft 100 based on the current orientation of the aircraft 100 calculated by the orientation calculation unit 161 and a target angular velocity of the target tilt angle obtained by the tilt angular velocity acquisition unit 162. Here, the target angular velocity of the target tilt angle is an angular velocity needed to transition to an orientation specified by external instructions. The target angular velocity of the target tilt angle is calculated as the difference between the rotational angular velocity of the aircraft 100 obtained by the IMU 150 and the desired angular velocity of the target tilt angle specified by external instructions. Further, the target orientation is a desired orientation of the observation specified by external instructions. Alternatively, the target orientation may be an intervening orientation between the current orientation and the desired orientation.

In the present embodiment, a coordinate axis corresponding to the target orientation is assigned in the orientation estimation unit 163. Thereafter, the orientation estimation unit 163 controls the actuators 120 and the motor units 140b using PID control such that the assigned coordinate axis is in a predetermined position relative to the ground surface. It should be noted that the actuators 120 and the motors units 140b are not limited to being controlled with PID control. Instead, any generally known feedback control scheme may be used.

The camera 200 is an imaging device with a predetermined view angle and captures video and still images in, e.g., the visible light spectrum. The camera 200 is fixed to the base 110 so as to be immovable relative to the base 110. In other words, contrary to conventional devices, a movable unit that can turn the camera 200 to face an observation target is not provided. Accordingly, the connection between the base 110 and the camera 200 may be simplified. Further, the weight of the observation device 10 itself may be reduced.

The view angle of the camera 200 is a field of vision where photography is possible. The view angle is determined based on the shape of the imaging element, the film, and optics such as lenses. In the present embodiment, the camera 200 is configured such that the components of the aircraft 100 are outside of the view angle. In other words, during photography, the aircraft 100 itself is not captured. Specifically, as shown in FIG. 3, the optical axis of the lens of the camera 200 is disposed along the z-axis, such that the movement range of the propeller units 140a does not overlap with the view angle.

Figure 3:
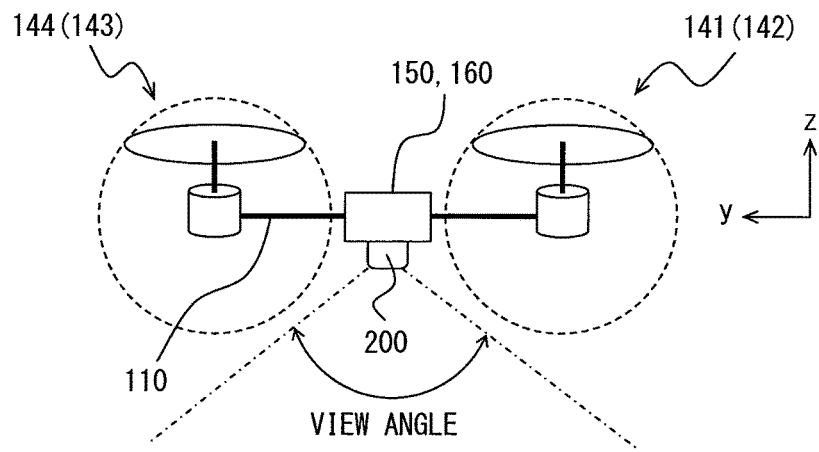
FIG. 3 is a view showing the relative positions of an aircraft and a view angle of a camera.

In FIG. 3, the movement range of the propeller units 140a is shown as the dashed line areas. It should be noted that in the present embodiment, the thrusters 140 rotate in accordance with the rotation of the shaft units 130. Accordingly, the movement range of the propeller units 140a is roughly spherical. In other words, in order to avoid overlapping the view angle of the camera 200 with this movement range, it is ensured that the propeller units 140a are not captured by the camera 200 regardless of the tilt angle of each thruster 140. As a result, the observation target may be observed.

In the present embodiment, the camera 200 is positioned in between the first shaft unit 131 and the second shaft unit 132 in the y-axis direction. As will be explained later, when the aircraft 100 rotates about the x-axis, that axis of rotation is located between the first shaft unit 131 and the second shaft unit 132. By positioning the camera in between the first shaft unit 131 and the second shaft unit 132, the imaging surface of the camera 200 is positioned as close to the axis of rotation of the aircraft 100 as possible. As a result, during imaging, the amount of panning may be suppressed.

Next, detailed operations of the observation device 10 will be explained with reference to FIGS. 4 to 19. Further, for simplicity, the IMU 150, the controller 160, and the camera 200 are omitted from FIGS. 4 to 19. In addition, it should be noted that the propulsion force of each thruster 140 is illustrated by the size and direction of a corresponding arrow.

In the present embodiment, the observation device 10 includes at least two flight modes, i.e., a horizontal flight mode and a vertical flight mode. Further, when the observation device 10 is transitioning between the horizontal flight mode and the vertical flight mode, the observation device 10 may maintain such an intermediate orientation in midair. Here, the horizontal flight mode is a flight mode where a plane including the base 110 and the shaft units 130, i.e., the xy-plane, is substantially parallel with the ground surface. Further, the vertical flight mode is a flight mode where the xy-plane is substantially orthogonal to the ground plane. Hereinafter, the maneuvers of each flight mode will be explained.

(Horizontal Flight Mode Maneuvers)

Figure 4:
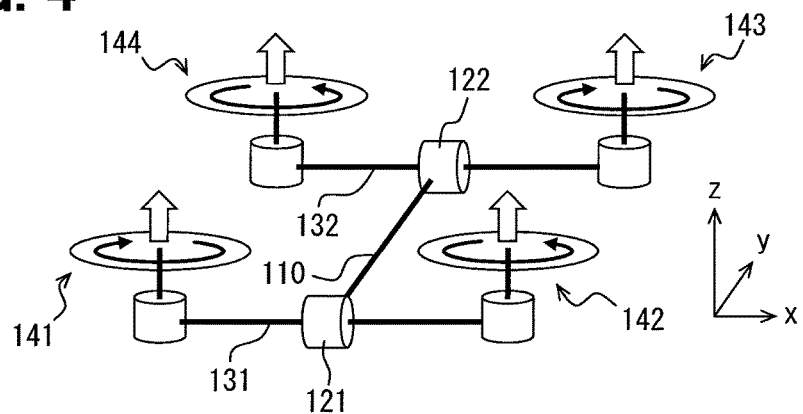
FIG. 4 is a view showing hovering in a horizontal flight mode.

First, hovering in the horizontal flight mode will be explained. As shown in FIG. 4, the rotation angles of the shaft units 130 are controlled by the actuators 120 such that the propulsion force of the four thrusters 140 are in the z direction. Further, in order to ensure that the propulsion force from all of the thrusters 140 is equal, the rotational speed of the propeller units 140a of the thrusters 140 are set to be substantially equal to each other.

The rotation directions of the propeller units 140a are set such that the first thruster 141 and the third thruster 143 rotation in an opposite direction as the second thruster 142 and the fourth thruster 144. This is to cancel out the torque reactions generated by the rotation of the propeller units 140a. When each thruster 140 is operating as described above, the aircraft 100 is able to maintain its orientation such that the xy-plane is substantially parallel with the ground surface. Further, it should be noted that the rotational speed (i.e., propulsion force) of the propeller units 140a is not limited to being exactly equal to each other. Instead, the propulsion force of the thrusters 140 is adjusted to reach an equilibrium torque (i.e., moment of force) about the center of gravity of the observation device 10.

Figure 5:
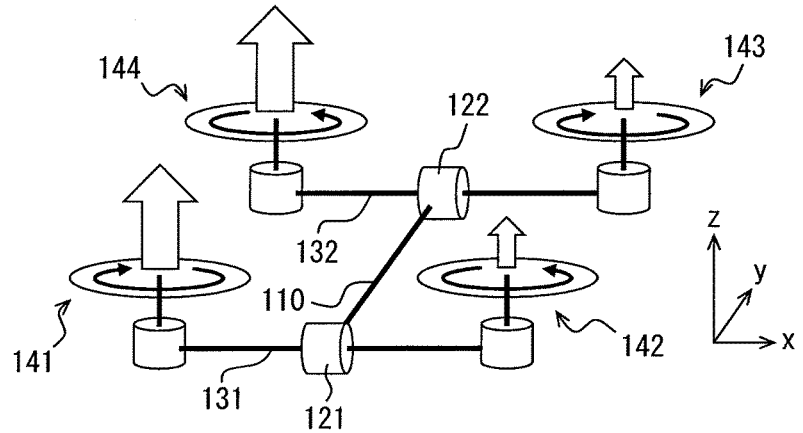
FIG. 5 is a view showing roll in a horizontal flight mode.

Next, roll adjustment in the horizontal flight mode will be explained. In the present embodiment, roll during horizontal flight is defined as a movement of rotation about the base 110, i.e., about the y-axis. In other words, the aircraft tilts about an axis of rotation along the y-axis. For example, as shown in FIG. 5, from a state where the xy-plane is substantially parallel to the ground surface, if the propulsion force of the first thruster 141 and the fourth thruster 144 is increased as compared to the second thruster 142 and the third thruster 143, then a torque about the y-axis is generated in the aircraft 100. By controlling the propulsion force of the thrusters 140 in the above described manner, roll adjustment in the aircraft 100 is achieved. Further, if the propulsion force adjustments are reversed, then the rotation direction of the roll movement is also reversed.

Figure 6:
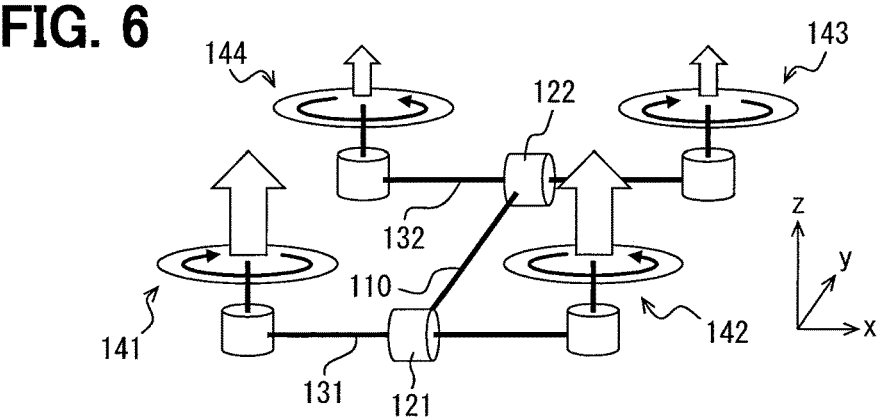
FIG. 6 is a view showing pitch in a horizontal flight mode.

Next, pitch adjustment in the horizontal flight mode will be explained. In the present embodiment, pitch during horizontal flight is defined as a movement of rotation about the direction in which the shaft units 130 extend, i.e., about the x-axis. In other words, the aircraft tilts about an axis of rotation along the x-axis. For example, as shown in FIG. 6, from a state where the xy-plane is substantially parallel to the ground surface, if the propulsion force of the first thruster 141 and the second thruster 142 is increased as compared to the third thruster 143 and the fourth thruster 144, then a torque about the x-axis is generated in the aircraft 100. By controlling the propulsion force of the thrusters 140 in the above described manner, pitch adjustment in the aircraft 100 is achieved. Further, if the propulsion force adjustments are reversed, then the rotation direction of the pitch movement is also reversed.

Figure 7:
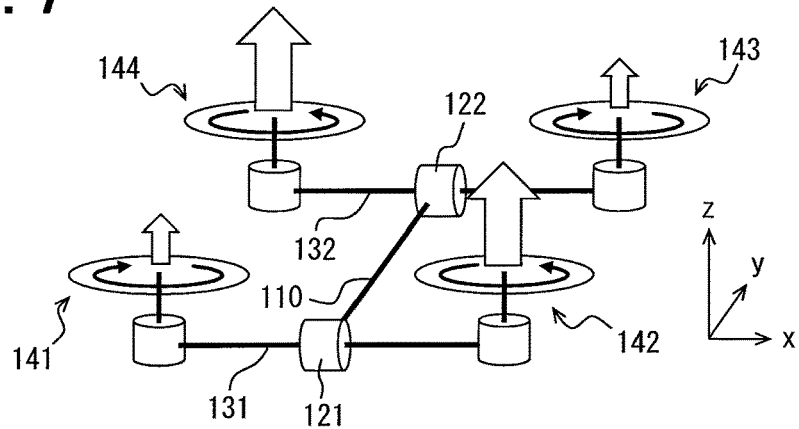
FIG. 7 is a view showing yaw in a horizontal flight mode.

Next, yaw adjustment in the horizontal flight mode will be explained. In the present embodiment, yaw during horizontal flight is defined as a movement of rotation about the z-axis. During this maneuver, the aircraft 100 itself does not tilt, but rather changes direction by rotating about the z-axis. In order to perform yaw adjustment, for example as shown in FIG. 7, in a state where the xy-plane is substantially parallel to the ground surface, the propulsion force of the second thruster 142 and the fourth thruster 144 may be increased as compared to the first thruster 141 and the third thruster 143. In this state, the torque reaction due to the rotation of the second thruster 142 and the fourth thruster 144 exceeds that of the first thruster 141 and the third thruster 143. As a result, a torque about the z-axis is generated in the aircraft 100. By controlling the propulsion force of the thruster 140 in the above described manner, yaw adjustment in the aircraft 100 is achieved. Further, if the propulsion force adjustments are reversed, then the rotation direction of the yaw movement is also reversed.

(Transition from Horizontal Flight Mode to Vertical Flight Mode)

The shaft units 130 are rotated by the actuators 120 in order to perform a transition from the horizontal flight mode to the vertical flight mode. Specifically, in contrast to existing quadcopters, the direction of the propulsion force of the thrusters may be changed with respect to the base 110 by changing the tilt angle in the present embodiment. Accordingly, it is possible to transition from the horizontal flight mode to the vertical flight mode. Further, in FIGS. 8 to 11, the tilt angle is defined as positive in the counter-clockwise direction and negative in the clockwise direction. When the aircraft 100 is hovering in the horizontal flight mode, the tilt angle is defined as zero. In other words, a tilt angle of zero corresponds to when the propulsion force of the thrusters 140 is pointed in the z direction.

Figure 8:
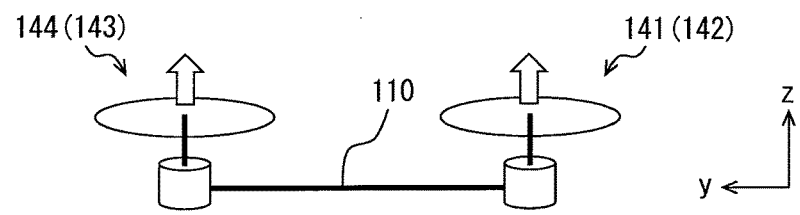
FIG. 8 is a view showing hovering in a horizontal flight mode prior to transitioning to a vertical flight mode.

FIG. 8 is a front view of the observation device 10 from the x-axis, showing the observation device 10 hovering in the horizontal flight mode. Further, the downward direction in FIG. 8 corresponds to a vertically downward direction. As described above, when hovering in the horizontal flight mode, the thrusters 140 are configured to generate propulsion force in the z direction.

For example, assume that an instruction to transition into the vertical flight mode is received, such that the orientation of the aircraft 100 is to rotate in the counter-clockwise direction (i.e., a positive rotation direction) of FIG. 8. At this time, the controller 160 changes the orientation of the aircraft 100 by controlling the tilt angle and the output of the motor units 140b and the thrusters 140.

Specifically, at the start of the maneuver, a pitch maneuver is first performed in the horizontal flight mode, so as to rotate about the x-axis. In other words, as shown in FIG. 6, from a state where the xy-plane is substantially parallel to the ground surface, the propulsion force of the first thruster 141 and the second thruster 142 is increased as compared to the third thruster 143 and the fourth thruster 144. As a result, a torque about the x-axis is generated in the aircraft 100, and a pitch maneuver is started.

Once the aircraft 100 is tilted, the first shaft unit 131 is rotated such that the tilt angle of the first thruster 141 and the second thruster 142 is positive with respect to the vertical direction. Further, the second shaft unit 132 is rotated such that the tilt angle of the third thruster 143 and the fourth thruster 144 is negative with respect to the vertical direction. As a result, a torque in the positive rotation direction is applied to the aircraft 100 and the pitch maneuver continues.

Figure 9:
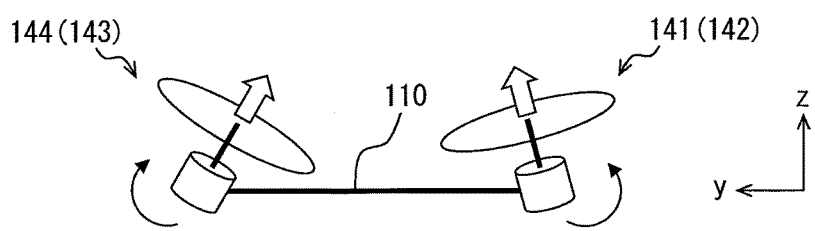
FIG. 9 is a view showing an initial operation for transitioning from a horizontal flight mode to a vertical flight mode.

Alternatively, as shown in FIG. 9, the vector of the propulsion force of the first thruster 141 and the second thruster 142 may be tilted counter-clockwise at the start of the maneuver in order to start the pitch maneuver. In other words, the first shaft unit 131 is rotated such that the tilt angle of the first thruster 141 and the second thruster 142 are positive. Further, the vector of the propulsion force of the third thruster 143 and the fourth thruster 144 are tilted in the clockwise direction of FIG. 9. In other words, the second shaft unit 132 is rotated such that the tilt angle of the third thruster 143 and the fourth thruster 144 is negative. Here, the absolute value of the tilt angle of the first thruster 141 and the second thruster 142 is set to be smaller than the absolute value of the tilt angle of the third thruster 143 and the fourth thruster 144.

By changing the tilt angle, the inclination of the propulsion force of each thruster 140 is maintained with respect to the z-axis. In other words, the propulsion force may be separated into a lift along the z-axis and a force along the y-axis. Since the tilt angle of the first thruster 141 and the second thruster 142 is smaller than the tilt angle of the third thruster 143 and the fourth thruster 144, the lift generated by the first thruster 141 and the second thruster 142 is greater than the lift generated by the third thruster 143 and the fourth thruster 144. Accordingly, a torque in the positive rotation direction is applied to the aircraft 100.

Figure 10:
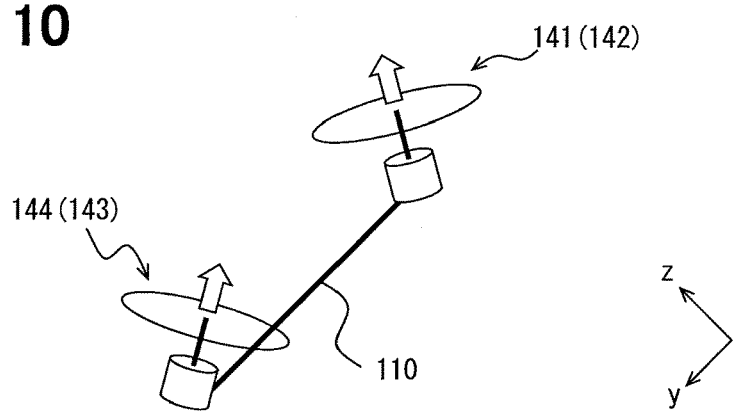
FIG. 10 is a view showing an operation midway through transitioning from a horizontal flight mode to a vertical flight mode.

As described above, the aircraft 100 begins to tilt from the horizontal flight mode. However, even after the aircraft 100 begins rotating, the controller 160 continues to control the actuators 120 to rotate the shaft units 130. FIG. 10 shows the aircraft 100 inclined 45 degrees toward the ground surface, which is an intervening state during the transition from the horizontal flight mode to the vertical flight mode. As shown in FIG. 10, the first thruster 141 and the second thruster 142 are slightly positively tilted with respect to the vertical direction, i.e., the direction of gravity. Further, the third thruster 143 and the fourth thruster 144 are slightly negatively tilted with respect to the vertical direction. Accordingly, a positive torque is applied to the aircraft 100, and the aircraft 100 continues to rotate in the positive rotation direction.

Figure 11:
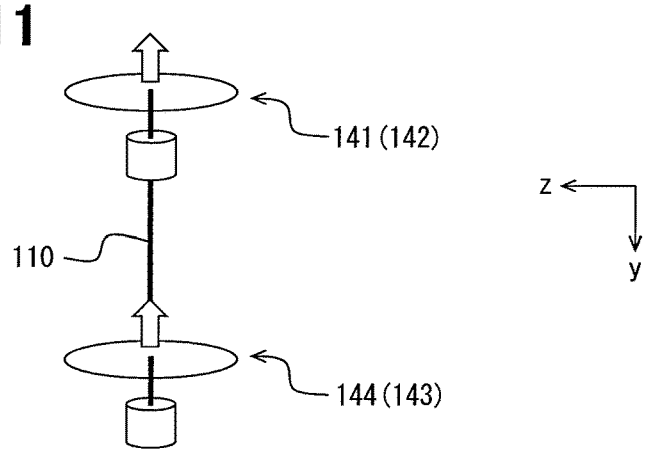
FIG. 11 is a view showing hovering after transitioning to a vertical flight mode.

As shown in FIG. 11, once the base 110 of the aircraft 100 has rotated to follow the vertical direction, the controller 160 instructs the actuators 120 to fix the tilt angles. In other words, the tilt angle of all thruster 140 is fixed to −90 degrees. That is, the propulsion force of each thruster 140 follows the y-axis. As a result, torque which contributes to rotation is not generated, and only lift is generated so that the aircraft 100 is in a hovering state. Accordingly, the transition from the horizontal flight mode to the vertical flight mode is completed.

During the transition from the horizontal flight mode to the vertical flight mode, the magnitude of the propulsion force of each thruster 140 is preferably adjusted based on the tilt angle. Compared to the horizontal flight mode, when each thruster 140 is tilted, airflow interference may occur due to changes in the relative positions of the thrusters 140. Further, airflow disturbance may occur due to changes in the relative positions between the thrusters 140 and the base 110, the IMU 150, the controller 160, and the battery. Accordingly, when the aircraft 100 is in an inclined state toward the ground surface, the propulsion force is preferably increased as compared to during the horizontal flight mode.

Specifically, the actual tilt angle dependence factor of the propulsion force may be measured beforehand, and then the propulsion force of each thruster 140 is corrected based on the tilt angle to achieve hovering. In other words, when transitioning from the horizontal flight mode to the vertical flight mode, the propulsion force of the thruster 140 is feedforward controlled according to the tilt angle of each thruster 140. As a result, when transitioning from the horizontal flight mode to the vertical flight mode, the orientation of the aircraft 100 may be changed without losing altitude.

(Vertical Flight Mode Maneuvers)

Figure 12:
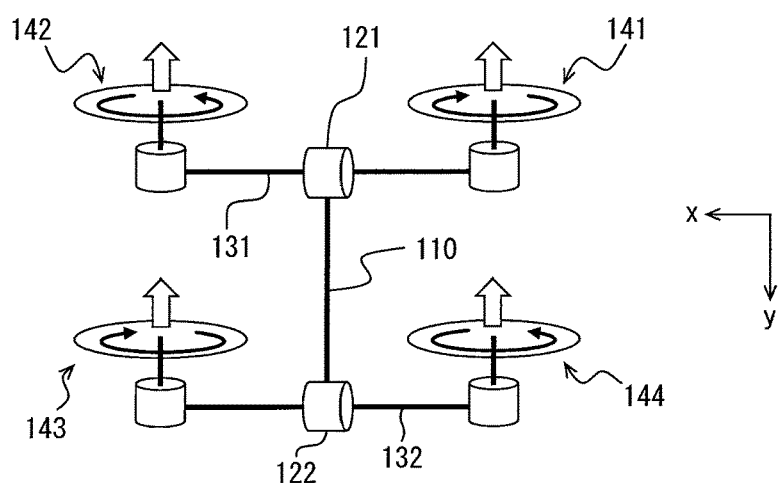
FIG. 12 is a view showing hovering in the vertical flight mode.

First, hovering in the vertical flight mode will be explained. As shown in FIG. 12, the rotation angles (i.e., tilt angle) of the shaft units 130 are controlled by the actuators 120 such that the propulsion force of the four thrusters 140 are in the y direction. Further, in order to ensure that the propulsion force from all of the thrusters 140 is equal, the rotational speed of the propeller units 140a of the thrusters 140 are set to be substantially equal to each other. In other to cancel out reaction torque, the rotation directions of the propeller units 140a are set such that the first thruster 141 and the third thruster 143 rotation in an opposite direction as the second thruster 142 and the fourth thruster 144. When each thruster 140 is operating as described above, the aircraft 100 is able to maintain its orientation such that the xy-plane is substantially orthogonal with the ground surface.

When hovering in the vertical flight mode, the orientation of the aircraft 100 may be further stabilized by setting the propulsion force of the upper thrusters in the vertical direction (in the present embodiment, the first thruster 141 and the second thruster 142) to be larger than propulsion force of the lower thrusters in the vertical direction (in the present embodiment, the third thruster 143 and the fourth thruster 144). This is because the vertically lower thrusters 143, 144 are suspended from the aircraft 100.

Figure 13:
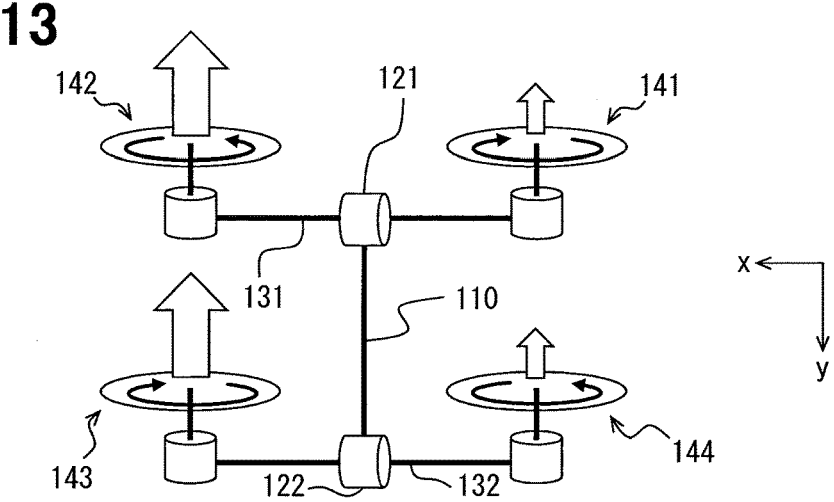
FIG. 13 is a view showing roll in the vertical flight mode.

Next, roll adjustment in the vertical flight mode will be explained. In the present embodiment, roll during vertical flight is defined as a movement of aircraft 100 about the z-axis. For example, as shown in FIG. 13, from a state where the xy-plane is substantially orthogonal to the ground surface, if the propulsion force of the second thruster 142 and the third thruster 143 is increased as compared to the first thruster 141 and the fourth thruster 144, then a torque about the z-axis is generated in the aircraft 100. By controlling the propulsion force of the thrusters 140 in the above described manner, roll adjustment in the aircraft 100 is achieved. Further, if the propulsion force adjustments are reversed, then the rotation direction of the roll movement is also reversed.

Figure 14:
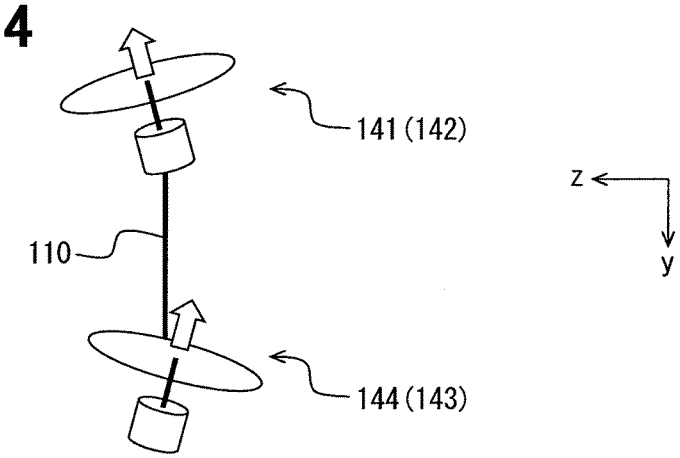
FIG. 14 is a view showing pitch in the vertical flight mode.

Next, pitch adjustment in the vertical flight mode will be explained. In the present embodiment, pitch during vertical flight is defined as a movement of the aircraft 100 about the x-axis. For example, as shown in FIG. 14, from a state where the xy-plane is substantially orthogonal to the ground surface, the first thruster 141 and the second thruster 142 are slightly positively tilted with respect to the vertical direction, the third thruster 143 and the fourth thruster 144 are slightly negatively tilted with respect to the vertical direction, and the thrusters 140 are maintained in this state. Accordingly, a positive torque is applied to the aircraft 100, and a pitch maneuver where the entire aircraft 100 rotates in the positive rotation direction may be achieved. Further, if the directions of the tilt angles are reversed, then the rotation direction of the pitch movement is also reversed.

Figure 15:
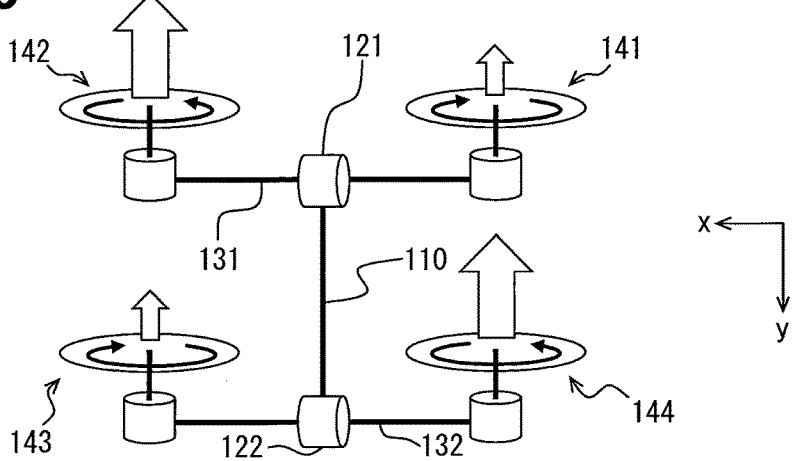
FIG. 15 is a view showing yaw in the vertical flight mode.

Next, yaw adjustment in the vertical flight mode will be explained. In the present embodiment, yaw during vertical flight is defined as a movement of rotation about the y-axis. During this maneuver, from a state where the xy-plane is substantially orthogonal to the ground surface, the aircraft 100 changes direction by rotating about the y-axis. In order to perform yaw adjustment, for example as shown in FIG. 15, in a state where the xy-plane is substantially orthogonal to the ground surface, the propulsion force of the second thruster 142 and the fourth thruster 144 may be increased as compared to the first thruster 141 and the third thruster 143. In this state, the torque reaction due to the rotation of the second thruster 142 and the fourth thruster 144 exceeds that of the first thruster 141 and the third thruster 143. As a result, a torque about the y-axis is generated in the aircraft 100. By controlling the propulsion force of the thruster 140 in the above described manner, yaw adjustment in the aircraft 100 is achieved. Further, if the propulsion force adjustments are reversed, then the rotation direction of the yaw movement is also reversed.

(Arbitrary Orientation Maneuvers)

It should be noted that after the transition from the horizontal flight mode to the vertical flight mode and the base 110 of the aircraft 100 is oriented along the vertical direction, the tilt angles are not fixed in the vertical direction. Instead, if the actuators 120 are driven such that the first thruster 141 and the second thruster 142 are slightly positively tilted with respect to the vertical direction, and the third thruster 143 and the fourth thruster 144 are slightly negatively tilted with respect to the vertical direction, then the aircraft 100 will continue to rotate in the positive rotation direction. In other words, the pitch maneuver continues through the vertical flight mode, and a 360 degree pitch rotation about the x-axis is possible.

Further, in the state shown in FIG. 10, i.e., when the aircraft 100 is inclined 45 degrees against the ground surface, if tilt angle of all of the thrusters 140 is fixed to −45 degrees and the propulsion force is set to be equal to each other, hovering may be performed in the inclined state. Further, the aircraft 100 is not limited to be inclined at 45 degrees toward the ground surface. In the present embodiment, the aircraft 100 may pitch 360 degrees about the x-axis, and may hover to maintain any arbitrary orientation toward the ground surface.

Even in such a case, as with the yaw maneuver during the horizontal flight mode, the rotational speed of each thruster 140 may be set to be different from each other, therefore generating a reaction torque to cause the aircraft 100 to yaw. In other words, even in a state where the z-axis is inclined toward the vertical direction, the aircraft 100 may rotate in a precession motion. Accordingly, the camera 200 fixed to the base 110 as shown in FIG. 1 may observe a target at all solid angles (i.e., 4π steradians).

(Other Maneuvers)

During the horizontal flight mode and the vertical flight mode, by adjusting the tilt angle of the thrusters 140, yaw motions with greater torque may be performed.

Figure 16:
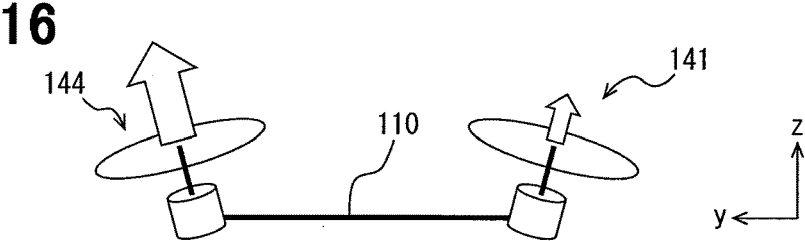
FIG. 16 is a view showing yaw in a horizontal flight mode.

Specifically, in addition to the horizontal flight mode yaw maneuver explained with reference to FIG. 7, as shown in FIG. 16, the first shaft unit 131 is negatively tilted, and the second shaft unit 132 is positively tilted. Accordingly, in addition to the reaction torque from each thruster 140, a torque about the z-axis is applied by the portions of the propulsion force along the y-axis. Thus a greater yaw torque may be obtained as compared to the yaw motion of FIG. 7.

Figure 17:
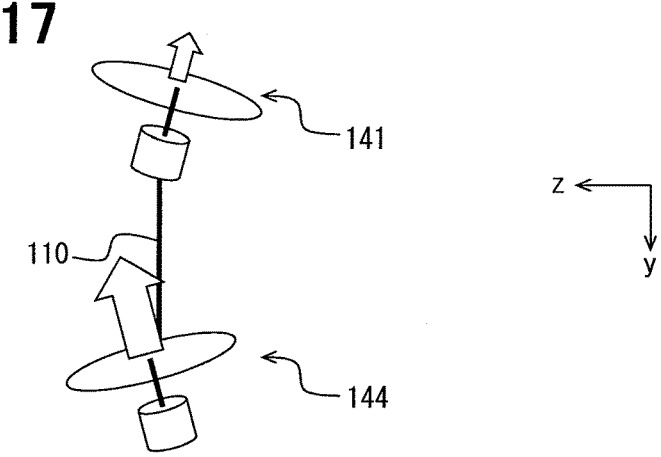
FIG. 17 is a view showing yaw in the vertical flight mode.

Further, in addition to the vertical flight mode yaw maneuver explained with reference to FIG. 15, as shown in FIG. 17, the first shaft unit 131 is negatively tilted, and the second shaft unit 132 is positively tilted. Accordingly, in addition to the reaction torque from each thruster 140, a torque about the y-axis is applied by the portions of the propulsion force along the z-axis. Thus a greater yaw torque may be obtained as compared to the yaw motion of FIG. 15.

Moreover, by adjusting the tilt angle of the thrusters 140, translational movement may be easily achieved during the horizontal flight mode and the vertical flight mode.

Figure 18:
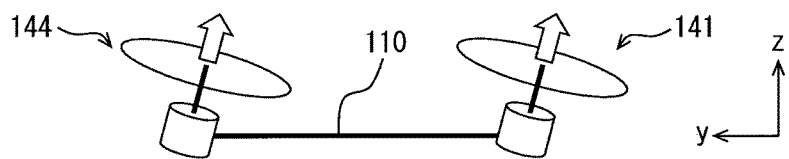
FIG. 18 is a view showing translational movement in a horizontal flight mode.

Specifically, in addition to the horizontal flight mode hovering maneuver explained with reference to FIG. 4, as shown in FIG. 18, the first shaft unit 131 is negatively tilted, and the second shaft unit 132 is negatively tilted. As a result, the propulsion force of the thrusters 140 include a force component along the y-axis direction, and thus the aircraft 100 translates along the y-axis. Further, if the direction of the tilt angle is reversed, the direction of the translational movement will also be reversed.

Figure 19:
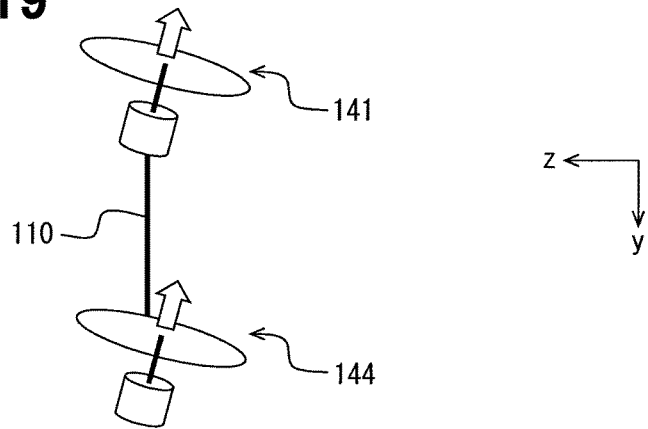
FIG. 19 is a view showing translational movement in a vertical flight mode.

Further, in addition to the vertical flight mode hovering maneuver explained with reference to FIG. 12, as shown in FIG. 19, the first shaft unit 131 is negatively tilted, and the second shaft unit 132 is negatively tilted. As a result, the propulsion force of the thrusters 140 include a force component along the z-axis direction, and thus the aircraft 100 translates along the z-axis. Further, if the direction of the tilt angle is reversed, the direction of the translational movement will also be reversed.

First Modified Embodiment

In the above described embodiment, the battery is, similar to the IMU 150, the controller 160, and the camera 200, described as collectively positioned at the center of gravity of the aircraft 100. Since the battery represents a large portion of the weight of the observation device 10, by positioning the battery at the center of gravity of the aircraft 100, stable flight may be achieved. However, it should be noted that the position of the battery is not limited to the center of gravity.

Figure 20:
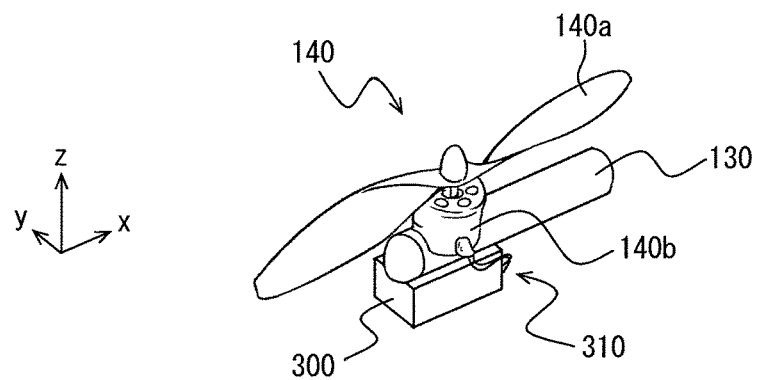
FIG. 20 is a perspective view showing an installation position of a battery.

For example, as shown in FIG. 20, batteries 300 may be fixed to the shaft units 130. Specifically, the batteries 300 may be configured such that as the shaft units 130 are tilted by the actuators 120, the batteries 300 rotate without moving relative to the thrusters 140. In other words, the batteries 300 may integrally move with the thrusters 140.

In this regard, the power cables 310 do not pass through the actuators 120, and thus the power cables 310 are less likely to be in tension when the shaft units 130 tilt. Further, the length of the power cables 310 may be shortened as compared to a case where the battery 300 is positioned at the center of gravity of the aircraft 100. Accordingly, the electrical resistance of the power cables 310 may be reduced, and thus power consumption may also be reduced.

As long as the batteries 300 are fixed to the shaft units 130 to move together with the thrusters 140, the above described effects may be conferred. However, as shown in FIG. 20, it is preferable if the batteries 300 are fixed to an opposite side of the shaft units 130 as the propeller units 140a, such that the motor units 140b are interposed between the batteries 300 and the propeller units 140a.

In order the generate the propulsion force, the propeller units 140a of the thrusters 140 rotate and push air in an opposite direction as the propulsion force. The propulsion force is a reaction force with regard to the air being pushed out. In the present embodiment, when the propeller units 140a of the thrusters 140 rotate, the air is pushed out toward the motor units 140b. By fixing the batteries 300 to an opposite side of the shaft units 130 as the propeller units 140a such that the motor units 140b are interposed between the batteries 300 and the propeller units 140a, disturbances in the air flow of the air being pushed out may be reduced.

Second Modified Embodiment

Figure 21:
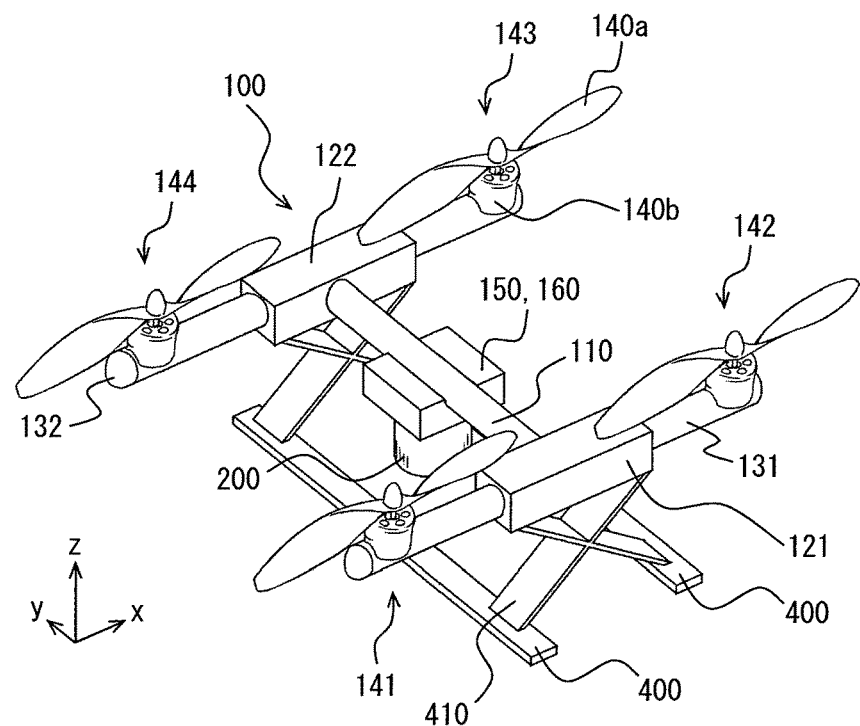
FIG. 21 is a perspective view showing the outline configuration of an observation device.

As shown in FIG. 21, the aircraft 100 preferably includes guard units 400 that prevent the thrusters 140 from contacting the ground surface when the aircraft 100 is landing. The guard units 400 are fixed to the aircraft 100 by support units 410. The guard units 400 protect the thrusters 140 during landing by contacting the ground surface before the thrusters 140 contact the ground surface.

In the present modified embodiment, the guard units 400 are board-shaped and extend in the y direction. The support units 410 of the guard units 400 are attached in a position that does not interfere with the movement range of the propeller units 140a of the thrusters 140. Further, the guard units 400 and the support units 410 are attached in a position outside of the view angle of the camera 200.

Figure 22:
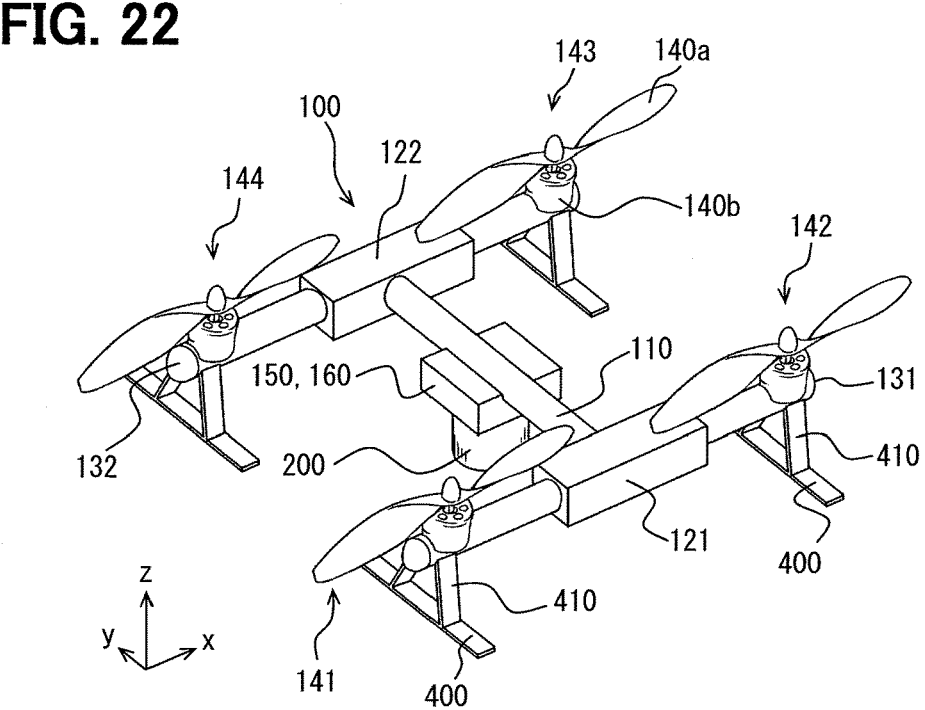
FIG. 22 is a perspective view showing the outline configuration of an observation device.

Further, as shown in FIG. 22, the guard units 400 may be attached to the shaft units 130 through the support units 410 instead. In this configuration, the guard units 400 integrally move with the thrusters 140 when the shaft units 130 move. In FIG. 22, the tilt angle of the shaft units 130 is zero. In other words, FIG. 22 shows the position of the guard units 400 during the horizontal flight mode. In this case, the guard units 400 extend along the y-axis. Further, during the vertical flight mode as shown in FIG. 12, the tilt angle of the shaft units 130 is −90 degrees, and accordingly, the guard units 400 would extend along the z-axis. Accordingly, even in the vertical flight mode, the guard units 400 may protect the thrusters 140 during landing by contacting the ground surface before the thrusters 140 contact the ground surface.

Third Modified Embodiment

Figure 23:
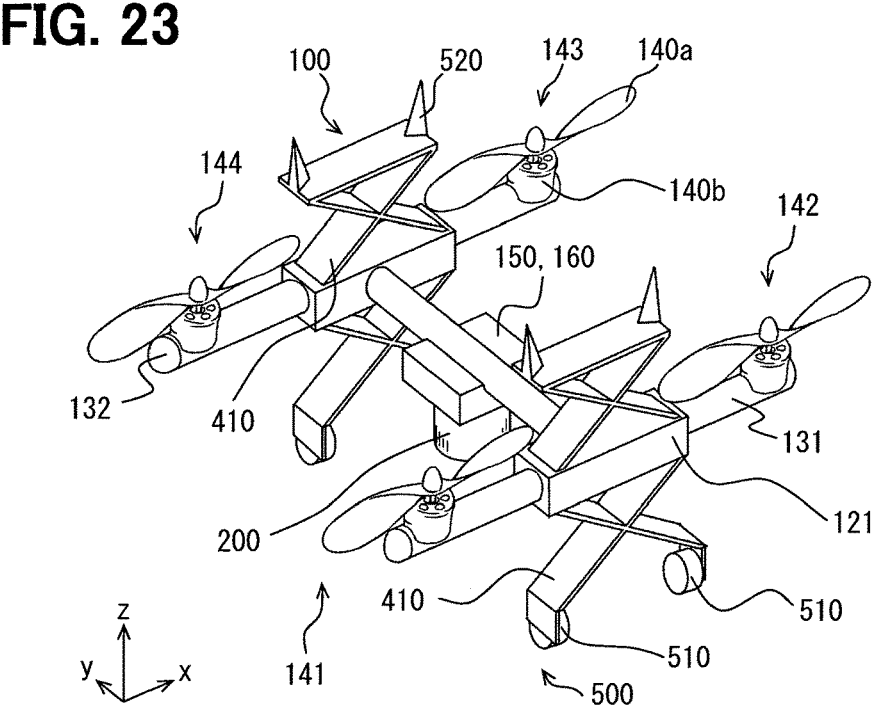
FIG. 23 is a perspective view showing the outline configuration of an observation device.

As shown in FIG. 23, the aircraft 100 may also include a landing gear 500 in place of, or in addition to, the guard units 400 of the second modified embodiment. The landing gear 500 supports the aircraft 100 on the ground surface. In the present modified embodiment, the landing gear 500 includes wheels 510 and stoppers 520.

The wheels 510 are attached to the aircraft 100 by the support units 410 and rotate, e.g., about the x-axis. Accordingly, once landed, the aircraft 100 may move along the ground surface due to the y-axis component of the propulsion force from the thrusters 140.

The stoppers 520 are attached by the support units 410, and are positioned symmetrically with the wheels 510 with the xy-plane as the plane of symmetry. In the present modified embodiment, the stoppers 520 are protruding members that protrude in the z-axis direction. In contrast to landing with the wheels 510, when the aircraft 100 lands upside-down (i.e., inverted 180 degrees), the tips of the stoppers 520 contact the ground to land. Thus, the observation device 10 may be landed while avoiding unintentional movement by landing with the stoppers 520 touching the ground.

Further, landing in the vertical flight mode may be performed with the entirety of the support units 410 and the wheels 510 contacting the ground surface. Further, in the vertical flight mode, the aircraft 100 may be inclined about the x-axis such that only the wheels 510 contact the ground, so that movement is possible using the wheels 510.

In the present modified embodiment, the landing gear 500 includes the wheels 510 and the stoppers 520, but the landing gear 500 may include floaters assuming water-landing or skis assuming snow-landing instead.

Second Embodiment

Figure 24:
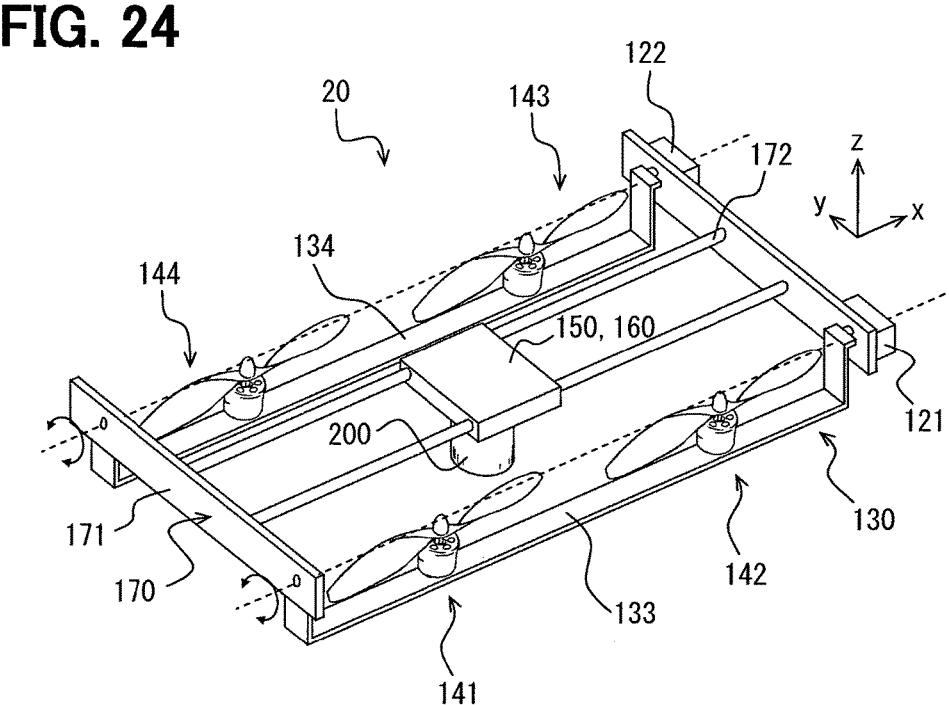
FIG. 24 is a perspective view showing the outline configuration of an observation device.

In the observation device 10 of the first embodiment, the aircraft 100 is shown as including the base 110 and the shaft units 130 (i.e., the first shaft unit 131 and the second shaft unit 132). In contrast, as shown in FIG. 24, an observation device 20 of the present embodiment includes an H-shaped base 170 and non-linear shaft units 130 (i.e., a first shaft unit 133 and a second shaft unit 134). Further, the thrusters 140, the IMU 150, the controller 160, the camera 200, and the batteries 300 are the same as those of the first embodiment and the first, second, and third modified embodiments, and thus the descriptions thereof are omitted for brevity.

Regarding the x, y and z-axes, similar to the first embodiment, a horizontal flight mode is defined as where the xy-plane is substantially parallel to the ground surface, and is compatible with the maneuvers described in the first embodiment. Specifically, for example, roll in the horizontal flight mode is a rotation maneuver about the y-axis, pitch is a rotation maneuver about the x-axis, and yaw is a rotation maneuver about the z-axis. Further, a transition from the horizontal flight mode to a vertical flight mode is performed by rotating about the x-axis.

As shown in FIG. 24, the base 170 includes two mutually parallel flat boards 171 and two posts 172 that are interposed between the two flat boards 171 and fix the relative positions of the flat boards 171. In the present embodiment, the flat boards 171 are positioned to face each other in the x-axis direction and to extend along the y-axis direction. The two posts 172 extend in the x-axis direction to link the two flat boards 171. Further, the IMU 150, the controller 160, and the camera 200 are collectively positioned at a substantially central portion of the posts 172.

As shown in FIG. 24, the shaft units 130 include the first shaft unit 133 and the second shaft unit 134 which are formed to be mutually parallel and extend along the x-axis. The shaft units 130 are connected to the flat boards 171 of the base 170 through slip rings. The shaft units 130 are rotatable about respective axes of rotation that lie on the x-axis. Further, the shaft units 130 are tilted by the actuators 121, 122 attached to the flat boards 171. The first thruster 141 and the second thruster 142 are fixed to the first shaft unit 133, while the third thruster 143 and the fourth thruster 144 are fixed to the second shaft unit 134.

Figure 25:
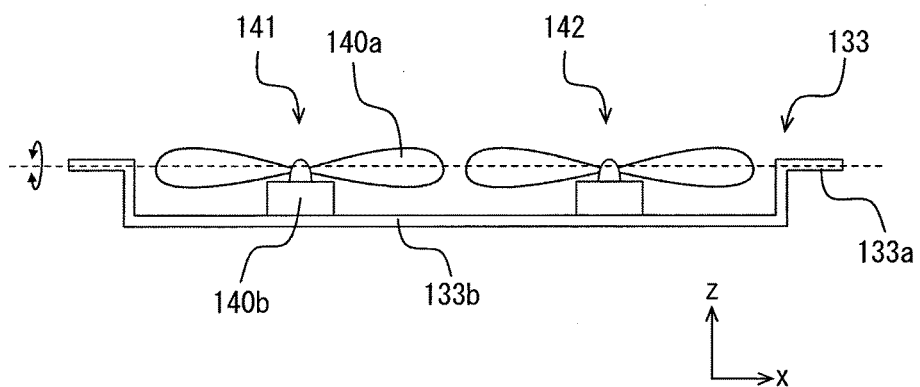
FIG. 25 is a view showing the outline configuration of a shaft unit.

In the present embodiment, each of the first shaft unit 133 and the second shaft unit 134 includes an on-axis member 133a, 134a and an off-axis member 133b, 134b. For example, as shown in FIG. 25, the first shaft unit 133 includes the on-axis member 133a which is formed on the axis of rotation of the first shaft unit 133. Here, the on-axis member 133a receives the driving force of the actuator 121. Further, the first shaft unit 133 includes the off-axis member 133b, which is positioned away from the axis of rotation of the first shaft unit 133. The on-axis member 133a and the off-axis member 133b are integrally formed in a rectangular shape, and rotate about an axis of rotation along the x-axis in accordance with the driving force from the actuator 121. Further, while FIG. 25 shows the outline configuration of the first shaft unit 133, the second shaft unit 134 includes the on-axis member 134a and the off-axis member 134b in a similar manner.

The motor units 140b of the thrusters 140 are fixed to the off-axis members 133b, 134b. Further, the rotation centers of the propeller units 140a, i.e., the center of their rotation circles, are positioned on the axes of rotation of the shaft units 130. Accordingly, contrary to a case where the shaft units 130 are simply rod-shaped, the movement range of the propeller units 140a may be minimized when the shaft units 130 tilt. By minimizing the movement range of the propeller units 140a, the propeller units 140a are more easily removed from the view angle of the camera 200.

Further, the shape of the shaft units 130 is not limited to the roughly rectangular shape shown in FIGS. 24 and 25. As long as the shaft units 130 include an off-axis member that is spaced away from the axis of rotation of the shaft units 130, and the thrusters 140 are fixed to the off-axis member, the above described effects may be conferred.

Since the various maneuvers are performed similarly as in the first embodiment, the descriptions thereof are omitted for brevity. Further, the positioning of the batteries 300, guard units, and a landing gear as described in the first embodiment and the first, second, and third modified embodiments, may also be applied to the second embodiment.

Figure 26:
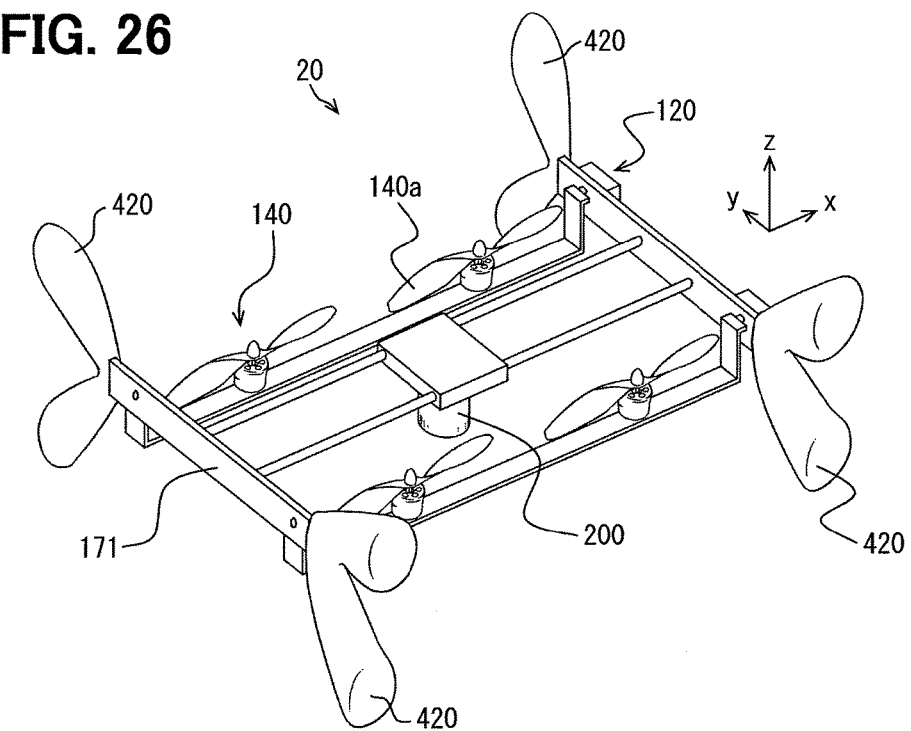
FIG. 26 is a perspective view showing an exemplary observation device including a guard unit.

For example, as shown in FIG. 26, the aircraft of the observation device 20 includes a total of four Y-shaped guard units 420 attached to either end in the y-axis direction of the two flat boards 171. Each guard unit 420 includes an end that extends in the y-axis direction and splits into two prongs, each prong extending in a different direction on the yz-plane. In other words, the four guard units 420 include a total of eight tips extending in eight direction.

Further, the guard units 420 may also serve as a landing gear. Specifically, when landing in the horizontal flight mode, four of the tips that are coplanar along the xy-plane will contact the ground. Further, when landing in the vertical flight mode, four of the tips that are coplanar along the zx-plane will contact the ground.

In the observation device 20 as well, the thrusters 140 are tilted by the actuators 120. In other words, the propeller units 140a have a substantially spherical movement range. Here, the eight tips of the guard units 420 form the corners of a rectangular solid that encompasses the movement range of the propeller units 140a. As a result, regardless of the orientation of the observation device 20 during landing, the propeller units 140a will not collide into the ground surface.

Figure 27:
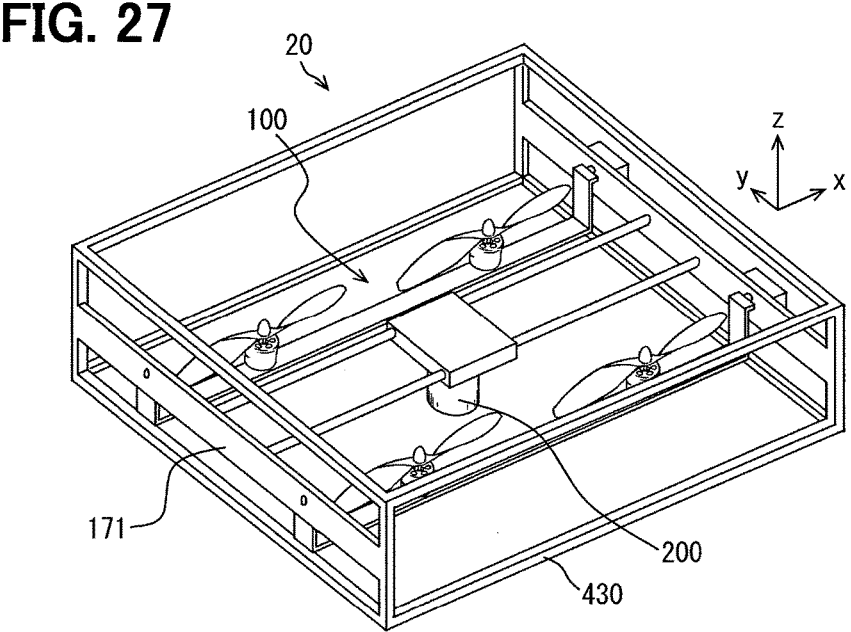
FIG. 27 is a perspective view showing an exemplary observation device including a guard unit.

In another example, as shown in FIG. 27, the aircraft 100 includes a guard unit 430 that forms a rectangular solid frame. The guard unit 430 is integrally formed with the flat boards 171. The eight corners of the rectangular solid of the guard unit 430 are formed so as to encompass the movement range of the propeller units 140a. As a result, regardless of the orientation of the observation device 20 during landing, the propeller units 140a will not collide into the ground surface. Thus, the guard unit 430 may function as a landing gear in the example of FIG. 27 as well.

OTHER EMBODIMENTS

A plurality of preferable embodiments of the present disclosure are discussed above. However, the present disclosure is not limited to these embodiments, and a variety of modifications which do not depart from the gist of the present disclosure are contemplated.

Each of the above described embodiments is described with reference to a quadcopter having four main thrusters 140. However, the number of the thrusters 140 is not limited. For example, a configuration is contemplated where at least two thrusters 140 are provided to generate propulsion forces whose direction may be changed with respect to the base 110, 170. In this configuration, the aircraft 100 may hover while in an inclined state toward the ground surface. Thus, the present disclosure may be applied to two-motored twin-copters, six-motored hexcopters, and the like.

Further, in each of the above described embodiments, the thrusters 140 are described as having propeller units 140a which rotate to generate a propulsion force. However, the propulsion mechanism is not limited to propellers, and may be ducted fans or rocket engines instead.

Further, in each of the above described embodiments, propeller-type thrusters 140 are used and one propeller unit 140a rotates on each axis of rotation of the motor units 140b. However, the present disclosure is not limited to this configuration. Instead, contra-rotating type thrusters 140 may be used, where two propeller units 140a which rotate in opposite directions are provided on each axis of rotation of the motors units 140b. As a result, the effects of reaction torque from each thruster 140 are suppressed, and stability during hovering may be improved. Further, controls for yaw maneuvers may be simplified.

Further, in each of the above described embodiments, a rod-shaped base 110 and an H-shaped base 170 are described, but the present disclosure is not limited to these shapes for a base. For example, a circular-shaped base may be used. Further, a wing-shaped base that generates lift in the z-axis direction may be used. In this case, flight similar to that of airplanes may be achieved by fixing the tilt angle of the shaft units 130 to substantially 90 degrees or −90 degrees.

The invention claimed is:

1. An observation device, comprising:
an aircraft; and
an observation unit attached to the aircraft, the observation unit observing a target within a predetermined view angle, wherein
the aircraft includes
  a base to which the observation unit is attached,
  at least two thrusters that generate a propulsion force including lift,
  actuators that change a direction of the propulsion force generated by the thrusters with respect to the base,
  an inertial measurement unit (IMU) that detects an orientation of the base with respect to a ground surface, and
  a controller that controls the thrusters and the actuators based on the orientation of the base detected by the IMU,
the observation unit is fixedly attached to the base so as to be immovable relative to the base,
a first shaft unit and a second shaft unit are attached to the base through the actuators, axes of rotation of the first shaft unit and the second shaft unit being parallel to each other,
at least one of the thrusters is fixed to each of the first shaft unit and the second shaft unit,
the actuators are configured to change the direction of the propulsion force of the thrusters with respect to the base by rotating the first shaft unit and the second shaft unit about the axes of rotation, and
the aircraft is configured to fly with respect to the ground surface through a combination of a magnitude of the propulsion force and the direction of the propulsion force of each of the thrusters.

2. The observation device of claim 1, wherein
the observation unit is attached such that the base, the thrusters, the actuators, the IMU, and the controller are outside of the view angle of the observation unit.

3. The observation device of claim 1, wherein
the observation unit is positioned in between the first shaft unit and the second shaft unit.

4. The observation device of claim 1, wherein
the thrusters include propeller units and motor units, the motor units rotating the propeller units to generate the propulsion force,
the first shaft unit and the second shaft unit are linearly shaped and lie on the axes of rotation, and
the motor units are fixed on the axes of rotation.

5. The observation device of claim 1, wherein
the thrusters include propeller units and motor units, the motor units rotating the propeller units to generate the propulsion force,
each of the first shaft unit and the second shaft unit is integrally formed from an on-axis member that lies on the axes of rotation and an off-axis member spaced away from the axes of rotation, and
the motor units are fixed to the off-axis members of the first shaft unit and the second shaft unit such that rotation centers of the propeller units are positioned on the axes of rotation of the first shaft unit and the second shaft unit.

6. The observation device of claim 1, wherein
the thrusters include propeller units and motor units, the motor units rotating the propeller units to generate the propulsion force, and
the propeller units are contra-rotating type propeller units that include two rotors rotating in opposite directions about a same axis.

7. The observation device of claim 1, wherein
in a hovering state where different ones of the thrusters are at different heights in a vertical direction, the propulsion force of those of the thrusters positioned lower in the vertical direction is decreased as compared to the propulsion force of those of the thrusters positioned higher in the vertical direction.

8. The observation device of claim 1, wherein
in a hovering state where different ones of the thrusters are at different heights in a vertical direction, the propulsion force of the thrusters is increased as compared to when all of the thrusters are coplanar on a plane parallel with the ground surface.

9. The observation device of claim 1, further comprising:
batteries that drive the thrusters, wherein
the batteries are moved, integrally with the thrusters, by the actuators.

10. The observation device of claim 9, wherein
the thrusters include propeller units and motor units, the motor units rotating the propeller units to generate the propulsion force, and
the batteries are fixed such that the motor units are interposed between the batteries and the propeller units.

11. The observation device of claim 1, wherein
the aircraft includes a guard unit such that during landing, the thrusters and the observation unit do not contact the ground surface.

12. The observation device of claim 1, further comprising:
a landing gear fixed to the aircraft, the landing gear supporting the aircraft on the ground surface during landing.

13. The observation device of claim 12, wherein
the landing gear includes wheels and stoppers, the stoppers for generating friction on the ground surface,
the aircraft is configured to move along the ground surface when only the wheels contact the ground surface, and
the aircraft is configured to stop moving when the stoppers generate friction on the ground surface.

* * * * *